United States Patent
Sakuma (10) Patent No.: US 12,366,750 B2
(45) Date of Patent: Jul. 22, 2025

(54) VEHICLE DISPLAY CONTROL DEVICE, VEHICLE DISPLAY DEVICE, VEHICLE DISPLAY CONTROL METHOD AND COMPUTER-READABLE STORAGE MEDIUM

(71) Applicant: TOYOTA JIDOSHA KABUSHIKI KAISHA, Toyota (JP)

(72) Inventor: Yasushi Sakuma, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 17/817,068

(22) Filed: Aug. 3, 2022

(65) Prior Publication Data

US 2023/0048593 A1 Feb. 16, 2023

(30) Foreign Application Priority Data

Aug. 16, 2021 (JP) ................. 2021-132380

(51) Int. Cl.
*G02B 27/01* (2006.01)
*G01C 21/36* (2006.01)
(Continued)

(52) U.S. Cl.
CPC ....... *G02B 27/0101* (2013.01); *G01C 21/365* (2013.01); *G01C 21/3667* (2013.01);
(Continued)

(58) Field of Classification Search
CPC ........ G02B 27/0101; G02B 2027/0141; G01C 21/365; G01C 21/3667; G01C 21/3658;
G06F 3/013; G09G 3/002; G09G 2340/0464; G09G 2354/00; G09G 2380/10; G09G 2380/06
(Continued)

(56) References Cited

U.S. PATENT DOCUMENTS 11,193,785 B2 * 12/2021 Kimura ................ G01C 21/365
11,486,726 B2 * 11/2022 Kleen ..................... B60K 35/00
(Continued)

FOREIGN PATENT DOCUMENTS

JP    H0720405 B2 *  3/1995
JP    5771889 B       9/2015
(Continued)

OTHER PUBLICATIONS

Wolf et al., Elements of Photogrammetry with Applications in GIS, 2014, McGraw Hill, 4th edition (Year: 2014).*
(Continued)

*Primary Examiner* — Peter D Nolan
*Assistant Examiner* — Preston Jay Miller
(74) *Attorney, Agent, or Firm* — Dickinson Wright, PLLC (57) ABSTRACT

The appearance of content that guides a traveling path of a vehicle is improved. When a display control ECU shifts a path line, which is expressed by path line information included in map information for navigation, in a vehicle transverse direction in accordance with a distance along the vehicle transverse direction between a position of a vehicle and the path line, the display control ECU causes content to be displayed on a HUD at a corresponding position on the shifted path line.

9 Claims, 6 Drawing Sheets

(51) Int. Cl.
  *G06F 3/01* (2006.01)
  *G09G 3/00* (2006.01)
(52) U.S. Cl.
  CPC .............. *G06F 3/013* (2013.01); *G09G 3/002* (2013.01); *G02B 2027/0141* (2013.01); *G09G 2340/0464* (2013.01); *G09G 2354/00* (2013.01); *G09G 2380/10* (2013.01)
(58) Field of Classification Search
  USPC ........................................................ 701/431
  See application file for complete search history.

(56) References Cited

U.S. PATENT DOCUMENTS

| | | | | |
|---|---|---|---|---|
| 2015/0294571 | A1* | 10/2015 | Shida | ............... G01C 21/26 701/409 |
| 2018/0031849 | A1* | 2/2018 | Omanovic | ........... G01C 21/365 |
| 2018/0240258 | A1 | 8/2018 | Kosaka et al. | |
| 2020/0116518 | A1* | 4/2020 | Lee | .................. G06F 3/013 |
| 2020/0309555 | A1* | 10/2020 | Kumon | ................ G01C 21/365 |
| 2021/0405641 | A1* | 12/2021 | Agon | ................. B60W 40/072 |
| 2022/0080828 | A1* | 3/2022 | Sung | ..................... B60K 35/10 |
| 2022/0146840 | A1* | 5/2022 | Ota | ..................... B60K 35/233 |

FOREIGN PATENT DOCUMENTS

| | | |
|---|---|---|
| JP | 6536855 B2 | 7/2019 |
| WO | 2020/208779 A1 | 10/2020 |

OTHER PUBLICATIONS

Wolf et al., Elements of Photogrammetry with Applicationa in GIS, 2014, McGraw Hill, 4th edition (Year: 2014).*
English translation of JP-H0720405-B2 (Year: 1995).*

* cited by examiner

VEHICLE DISPLAY CONTROL DEVICE, VEHICLE DISPLAY DEVICE, VEHICLE DISPLAY CONTROL METHOD AND COMPUTER-READABLE STORAGE MEDIUM

CROSS-REFERENCE TO RELATED APPLICATION

This application is based on and claims priority under 35 USC § 119 from Japanese Patent Application No. 2021-132380 filed on Aug. 16, 2021, the disclosure of which is incorporated by reference herein.

TECHNICAL FIELD

The present disclosure relates to a vehicle display control device, a vehicle display device, a vehicle display control method and a computer-readable storage medium that stores a vehicle display control program.

RELATED ART

Japanese Patent No. 6536855 (Patent Document 1) discloses a technique in which, when a vehicle travels while following a preceding vehicle that is in front of the host vehicle, a marker image, which corresponds to the detected position of the preceding vehicle, is displayed on a HUD (Head-Up Display) so as to be superimposed on the preceding vehicle.

Figure 7:
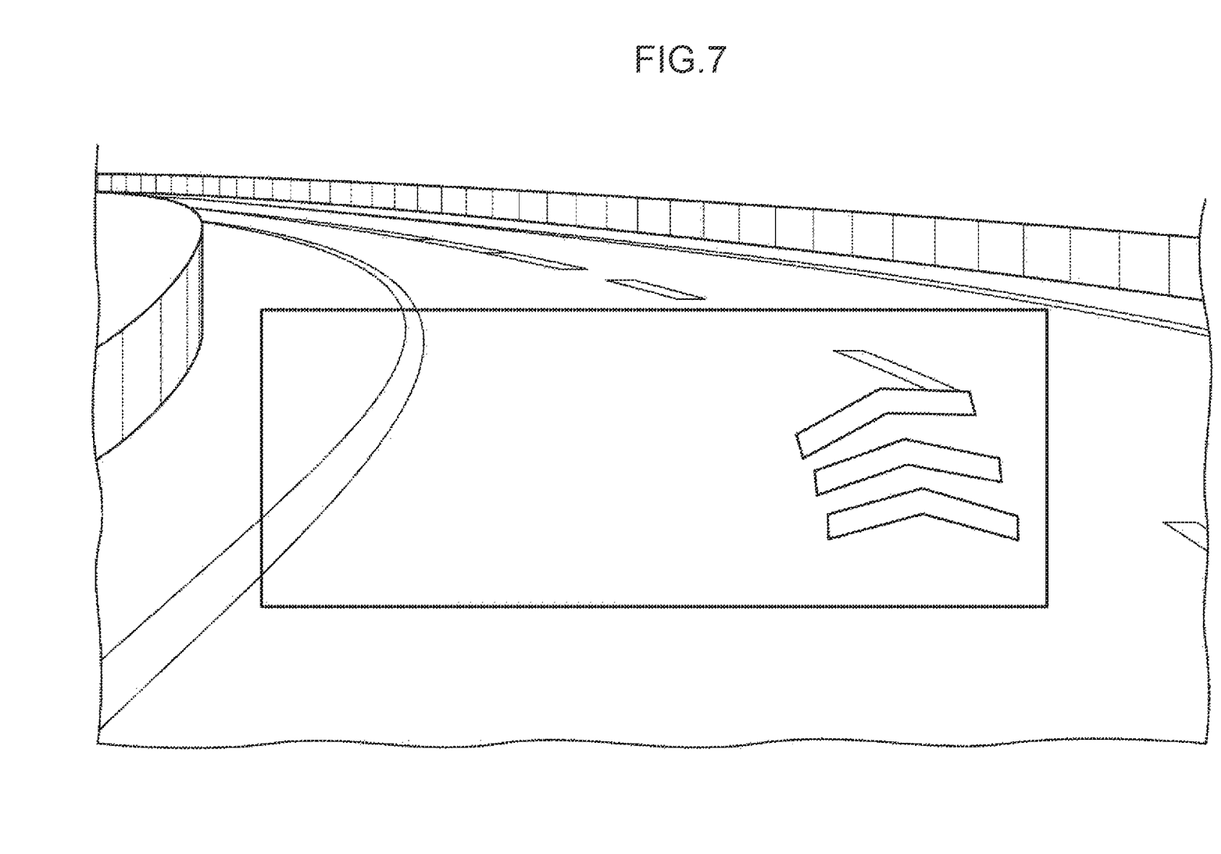
FIG. 7 is an image drawing illustrating a state in which, in a conventional technique, content that guides the traveling path of a vehicle is displayed with the position thereof offset in the vehicle transverse direction with respect to the lane being traveled, as seen from the driver.

Cases in which content, such as a mark or the like that guides the traveling path of a vehicle, is displayed on a HUD are not limited to cases in which a preceding vehicle exists. Therefore, it is thought to control the displayed position of content by using, as the reference thereof, the path line that is expressed by path line information included in map information for navigation. However, the accuracy of the vehicle transverse direction position of the path line expressed by path line information is insufficient for using the path line as the reference for the position of displaying content. Therefore, if content is displayed as is on the path line that is expressed by the path line information, as shown in FIG. 7, there are cases in which the content is displayed such that, as seen from the driver, the position thereof becomes offset in the vehicle transverse direction with respect to the lane in which the vehicle is traveling, and there is the problem that the appearance of the content deteriorates.

SUMMARY

The present disclosure was made in consideration of the above-described circumstances, and an object thereof is to provide a vehicle display control device, a vehicle display device, a vehicle display control method and a vehicle display control program, which can improve the appearance of content that guides the traveling path of a vehicle.

A vehicle display control device relating to a first aspect includes a display control section that, when shifting a path line, which is expressed by path line information included in map information for navigation, in a vehicle transverse direction in accordance with a distance along the vehicle transverse direction between a position of a vehicle and the path line, causes content to be displayed on a display device at a corresponding position on the shifted path line.

In the first aspect, when the path line is to be corrected (shifted) in the vehicle transverse direction by using the position of the vehicle as a reference, the content is made to be displayed on the display device at a corresponding position on the shifted path line. Due thereto, the content being displayed such that the position thereof is offset in the vehicle transverse direction from the lane in which the vehicle is traveling, is suppressed, and the appearance of the content that guides the traveling path of the vehicle can be improved.

In a second aspect, in the first aspect, the display control section specifies the vehicle transverse direction on the basis of an azimuth of the vehicle that is detected by an azimuth sensor.

In the second aspect, because the azimuth of the vehicle, which is detected by the azimuth sensor, is used in specifying the vehicle transverse direction, the vehicle transverse direction can be specified accurately.

In a third aspect, in the first aspect or the second aspect, the display control section uses a position of an eyepoint of a vehicle occupant who is within the vehicle as the position of the vehicle.

In the third aspect, the position of the eyepoint of a vehicle occupant within the vehicle is used as the position of the vehicle. Therefore, the content being displayed such that the position thereof is offset in the vehicle transverse direction from the traveling lane, as seen from the vehicle occupant, is suppressed. Accordingly, in accordance with the third aspect, the appearance of the content as viewed by a vehicle occupant can be improved more.

In a fourth aspect, in any of the first aspect through the third aspect, the display device is a HUD.

As described above, in the first aspect through the third aspect, the content being displayed such that the position thereof is offset in the vehicle transverse direction from the lane in which the vehicle is traveling, is suppressed. Therefore, by making the display device be a HUD, the display device can be made to function as an AR (Augmented Reality)—HUD.

A vehicle display device relating to a fifth aspect includes: the vehicle display control device of any of the first aspect through the fourth aspect; and a display device.

In accordance with the fifth aspect, in the same way as in the first aspect, the appearance of content that guides the traveling path of the vehicle can be improved.

A vehicle display control method relating to a sixth aspect causes a computer to execute processings including, when shifting a path line, which is expressed by path line information included in map information for navigation, in a vehicle transverse direction in accordance with a distance along the vehicle transverse direction between a position of a vehicle and the path line, causing content to be displayed on a display device at a corresponding position on the shifted path line.

In accordance with the sixth aspect, in the same way as in the first aspect, the appearance of content that guides the traveling path of the vehicle can be improved.

A vehicle display control program relating to a seventh aspect causes a computer to execute processings including, when shifting a path line, which is expressed by path line information included in map information for navigation, in a vehicle transverse direction in accordance with a distance along the vehicle transverse direction between a position of a vehicle and the path line, causing content to be displayed on a display device at a corresponding position on the shifted path line.

In accordance with the seventh aspect, in the same way as in the first aspect, the appearance of content that guides the traveling path of the vehicle can be improved.

The present disclosure can improve the appearance of content that guides the traveling path of a vehicle.

DETAILED DESCRIPTION

Figure 1:
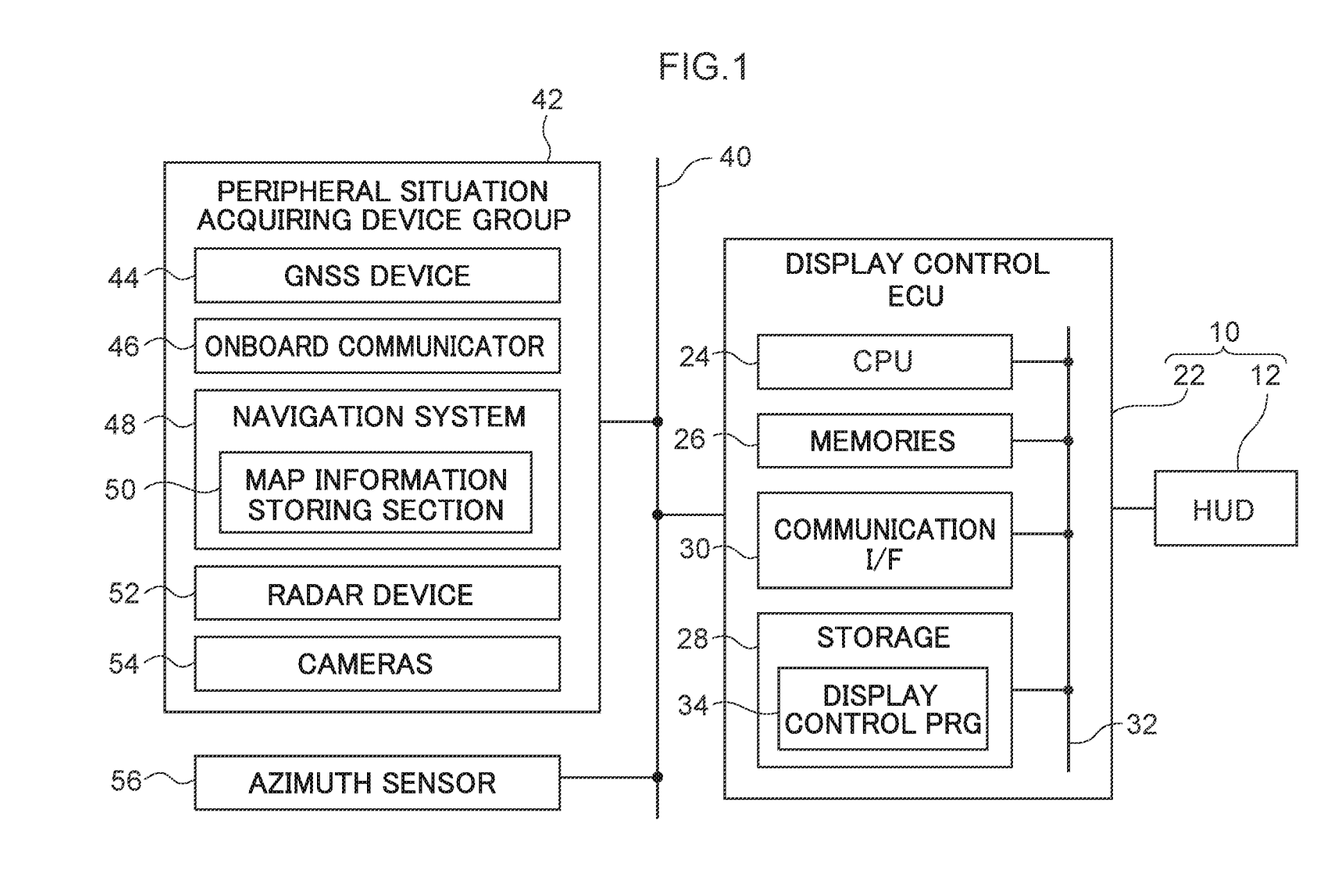
FIG. 1 is a block drawing illustrating the schematic structures of a vehicle display device relating to an exemplary embodiment and the periphery thereof.

Examples of exemplary embodiments of the present disclosure are described in detail hereinafter with reference to the drawings. A vehicle display device 10 relating to an exemplary embodiment is shown in FIG. 1. The vehicle display device 10 is installed in a vehicle, and includes a HUD 12 that is an example of a display device, and a display control ECU (Electronic Control Unit) 22 that controls the display of images by the HUD 12 such that the HUD 12 functions as an AR-HUD. Note that the display control ECU 22 is an example of the vehicle display control device relating to the present disclosure.

Figure 2:
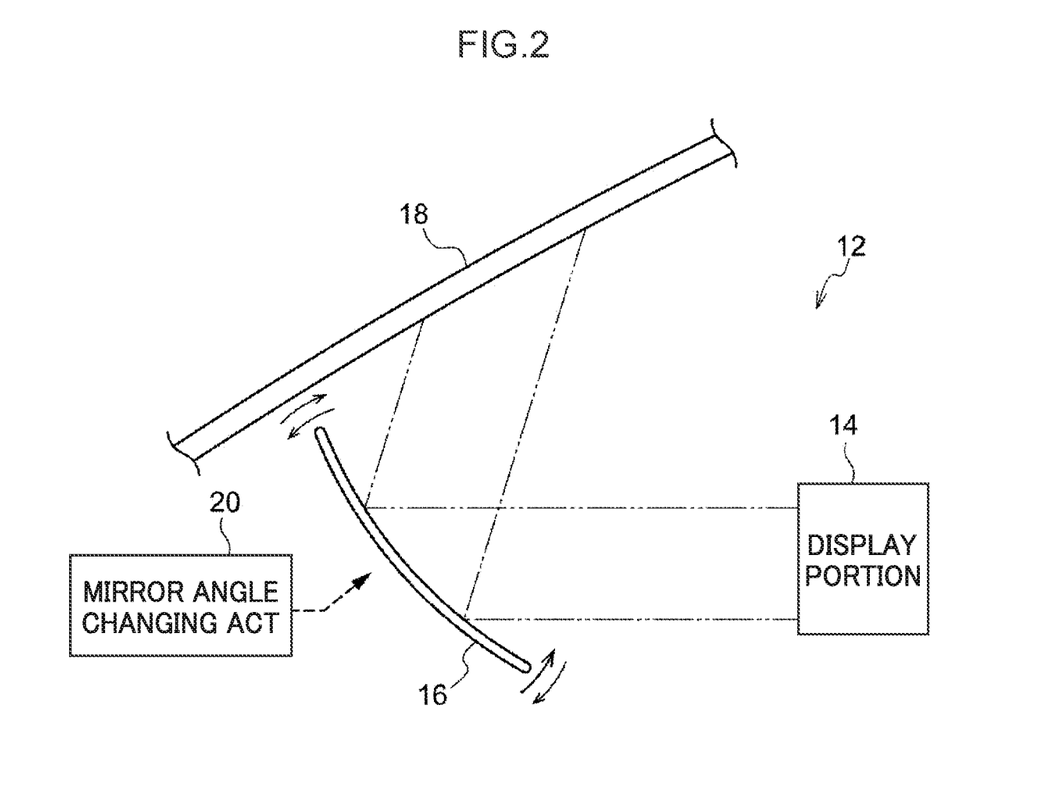
FIG. 2 is a schematic structure illustrating an example of a HUD.

As shown in FIG. 2, the HUD 12 includes a display portion 14 that emits projection light of images to be displayed, a mirror 16 that is formed by a concave mirror and reflects/projects the projection light emitted from the display portion 14 onto a windshield 18 of the vehicle, and a mirror angle changing ACT (actuator) 20. A treatment for forming a half-mirror or the like is carried out the vehicle cabin side surface of the windshield 18 at the portion thereof that is in the range where the displayed images are projected. Vehicle occupants can see the displayed images that are projected, and, through the windshield 18, can also see the view at the exterior of the vehicle. Due to the mirror angle changing ACT 20 changing the angle of the mirror 16, the position at which the displayed images are projected onto the windshield 18 can be changed.

As shown in FIG. 1, the display control ECU 22 includes a CPU (Central Processing Unit) 24, and memories 26 such as a ROM (Read Only Memory) and a RAM (Random Access Memory) and the like. Further, the display control ECU 22 includes a non-volatile storage 28 such as an HDD (Hard Disk Drive) or an SSD (Solid State Drive) or the like, and a communication interface (I/F) 30. The CPU 24, the memories 26, the storage 28 and the communication I/F 30 are connected via an internal bus 32 so as to be able to communicate with one another.

Figure 3:
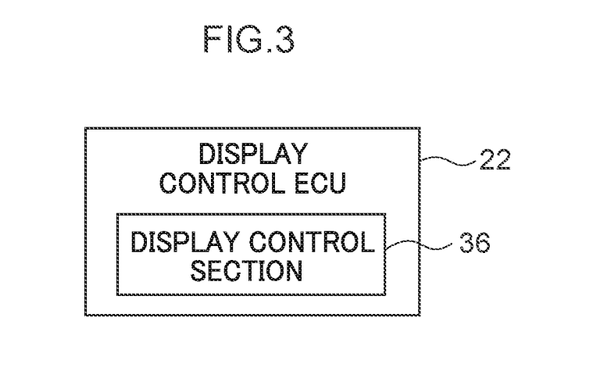
FIG. 3 is a functional block drawing of a display control ECU.

A display control program 34 is stored in the storage 28. Due to the display control program 34 being read-out from the storage 28 and being expanded in the memory 26, and the display control program 34 that is expanded in the memory 26 being executed by the CPU 24, the display control ECU 22 functions as a display control section 36 shown in FIG. 3, and carries out display control processing that is described later. When the display control section 36 shifts the path line, which is expressed by path line information included in map information for navigation, in the vehicle transverse direction in accordance with the distance in the vehicle transverse direction between the position of the vehicle and the path line, the display control section 36 displays content at, of the HUD 12, the corresponding position on the shifted path line. Note that the display control program 34 is an example of the vehicle display control program relating to the present disclosure.

Further, the display control ECU 22 is connected to a system bus 40. A peripheral situation acquiring device group 42 that acquires information relating to the situation at the periphery of the vehicle, and an azimuth sensor 56 that detects the azimuth of the vehicle, are connected to the system bus 40. The peripheral situation acquiring device group 42 includes, as devices that acquire information expressing what type of situation the vehicle peripheral environment is in, a GNSS (Global Navigation Satellite System) device 44, an onboard communicator 46, a navigation system 48, a radar device 52, cameras 54 and the like.

The GNSS device 44 receives GNSS signals from plural GNSS satellites and measures the position (the latitude and longitude) of the host vehicle. The onboard communicator 46 is a communication device that carries out at least one of inter-vehicle communication with other vehicles and road-to-vehicle communication with roadside devices. The navigation system 48 includes a map information storing section 50 that stores map information. On the basis of the position information obtained from the GNSS device 44 and the map information stored in the map information storing section 50, the navigation system 48 carries out processings such as displaying the position of the host vehicle on a map, guiding the path to the destination, and the like.

Figure 5:
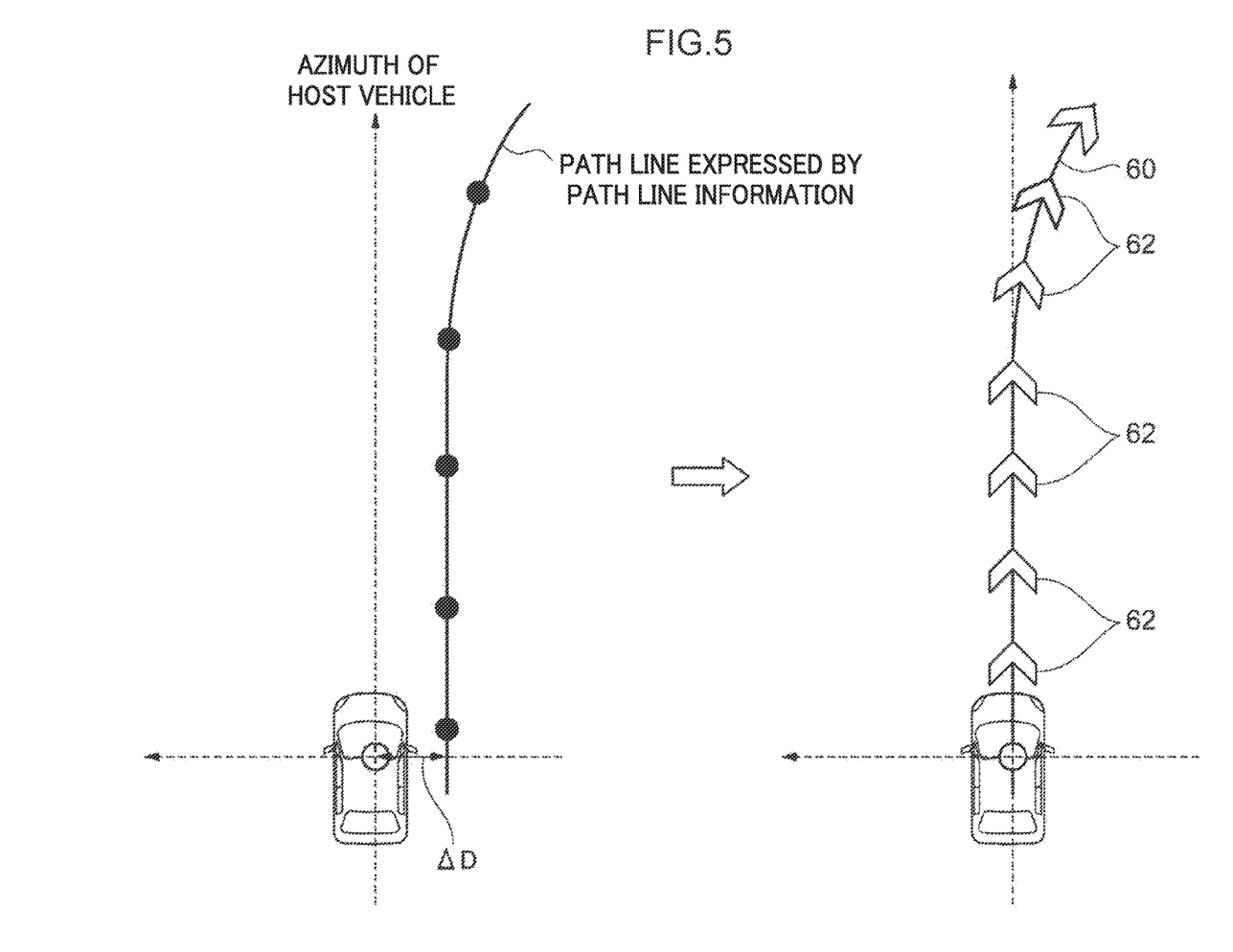
FIG. 5 is an image drawing for explaining processing of shifting a path line, which is expressed by path line information, in a vehicle transverse direction.

Note that the map information that is stored in the map information storing section 50 includes path line information that expresses path lines that are set along respective roads expressed by the map information. More specifically, as shown in FIG. 5 as well, the path line information is information expressing a path line by the respective latitudes and longitudes of a row of points that are disposed discretely on the path line.

The radar device 52 irradiates radio waves (e.g., millimeter waves) at the periphery of the vehicle, and detects objects such as pedestrians, other vehicles and the like existing at the periphery of the host vehicle from the reflected waves of the irradiated radio waves, and acquires the relative positions and the relative speeds between the host vehicle and the detected objects. Further, on the basis of changes in the relative positions and relative speeds of the individual objects that are included in the results of detection of the most recent plural times, and the like, the radar device 52 excludes, from objects of monitoring, noise, roadside objects such as guardrails and the like, and the like, and tracks and monitors specific objects, such as pedestrians and other vehicles and the like, as peripheral targets. Then, the radar device 52 outputs information such as the relative positions, relative speeds and the like of the individual peripheral targets. The cameras 54 capture images of the periphery of the host vehicle by plural cameras, and output the captured images.

Figure 4:
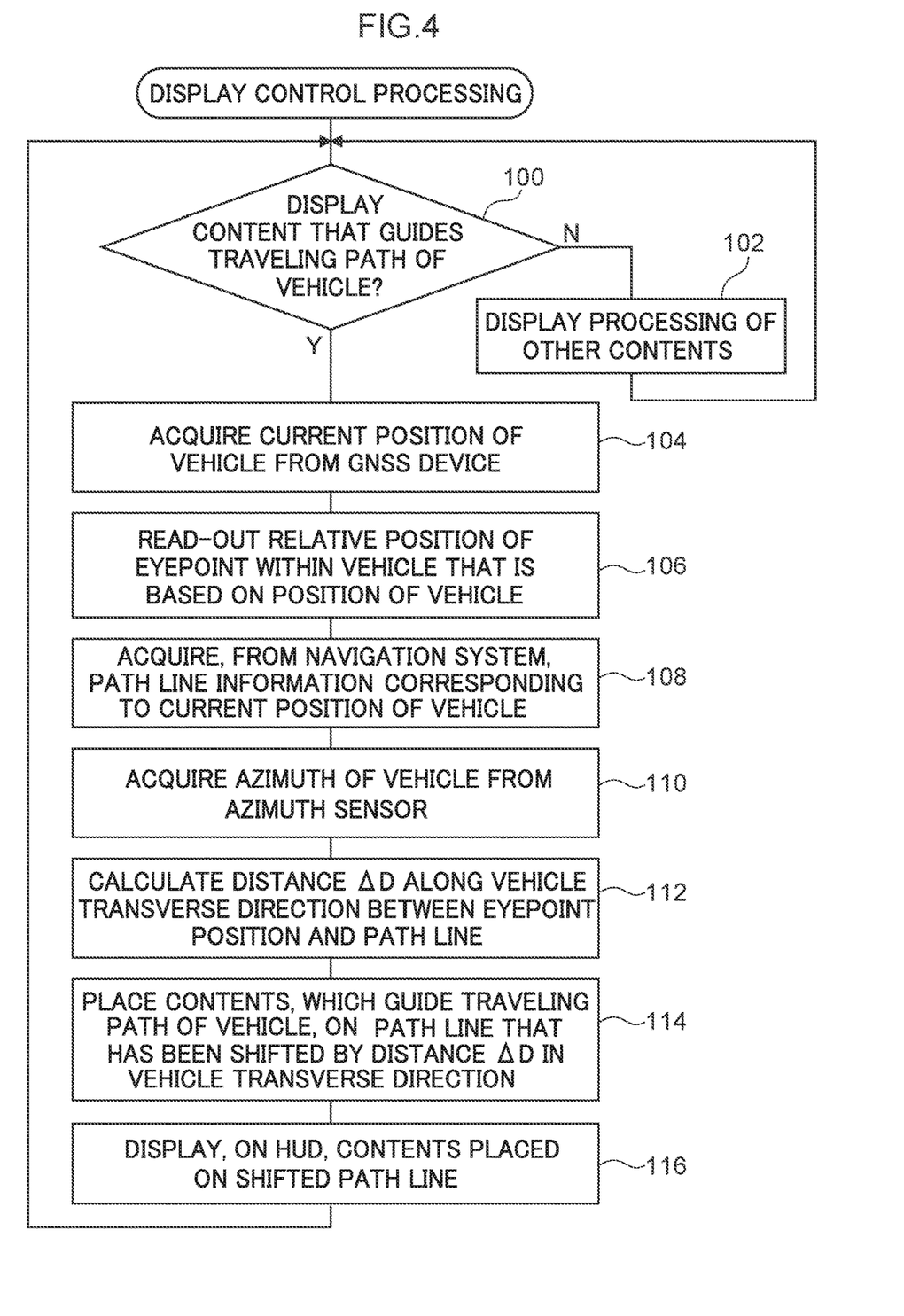
FIG. 4 is a flowchart illustrating an example of display control processing executed by the display control ECU.

The display control processing, which is carried out by the display control ECU 22 during the time period when the ignition switch of the vehicle is on, is described next with reference to FIG. 4 as the operation of the present exemplary embodiment.

In step 100 of the display control processing, the display control section 36 judges whether or not the current time is a time for displaying, on the HUD 12, content that guides the traveling path of the vehicle. For example, in a case in which the ACC (Adaptive Cruise Control) is on, and the host vehicle is traveling while following a preceding vehicle, or the like, the judgment in step 100 is negative, and the routine moves on to step 102. In step 102, the display control section 36 carries out processing that causes the HUD 12 to display other content (e.g., a mark expressing the set time between vehicles of the ACC, or the like).

If the judgment in step 100 is affirmative, the routine moves on to step 104. In step 104, the display control section 36 acquires the current position (the latitude and longitude) of the host vehicle from the GNSS device 44. Note that the current position of the host vehicle that is acquired here is, precisely, the latitude and the longitude of the set position of the GNSS device 44 at the host vehicle.

In next step 106, the display control section 36 reads-out, from the storage 28, the relative position of the eyepoint of a vehicle occupant within the host vehicle, which is based on the position of the host vehicle (the set position of the GNSS device 44). For example, this relative position can be measured and stored in the storage 28 in advance, or may be detected by a camera that captures images of the vehicle cabin interior including the vehicle occupants, or the like. Then, on the basis of the position of the host vehicle acquired in step 104 and the read-out relative position, the display control section 36 calculates the coordinates (the latitude and longitude) of the eyepoint of a vehicle occupant within the host vehicle.

In step 108, the display control section 36 acquires, from the navigation system 48, path line information corresponding to the position of the host vehicle acquired in step 104 (path line information expressing the path line that has been set for the road on which the host vehicle is currently traveling), and stores the acquired path line information in the memory 26. In step 110, the display control section 36 acquires the azimuth of the host vehicle from the azimuth sensor 56.

In step 112, the display control section 36 calculates distance AD (see FIG. 5) along the vehicle transverse direction (the direction orthogonal to the azimuth of the host vehicle acquired from the azimuth sensor 56) between the position of the eyepoint of the vehicle occupant within the host vehicle and path line expressed by the path line information acquired in step 108.

In step 114, the display control section 36 shifts the respective latitudes and longitudes of the row of points, which are included in the path line information stored in the memory 26, in the vehicle transverse direction by the distance AD, and thereby shifts the path line, which is expressed by the path line information stored in the memory 26, in the vehicle transverse direction by the distance AD. The shifted path line is denoted by reference numeral "60" in FIG. 5. Moreover, the display control section 36 places plural contents 62, which guide the traveling path of the vehicle, on the path line 60 that has been shifted in the vehicle transverse direction by the distance AD. Note that the present exemplary embodiment uses, as the contents 62, graphics which are shapes formed by bending rectangular graphics, at length direction intermediate portions thereof, in the direction of guiding the traveling path of the vehicle.

Figure 6:
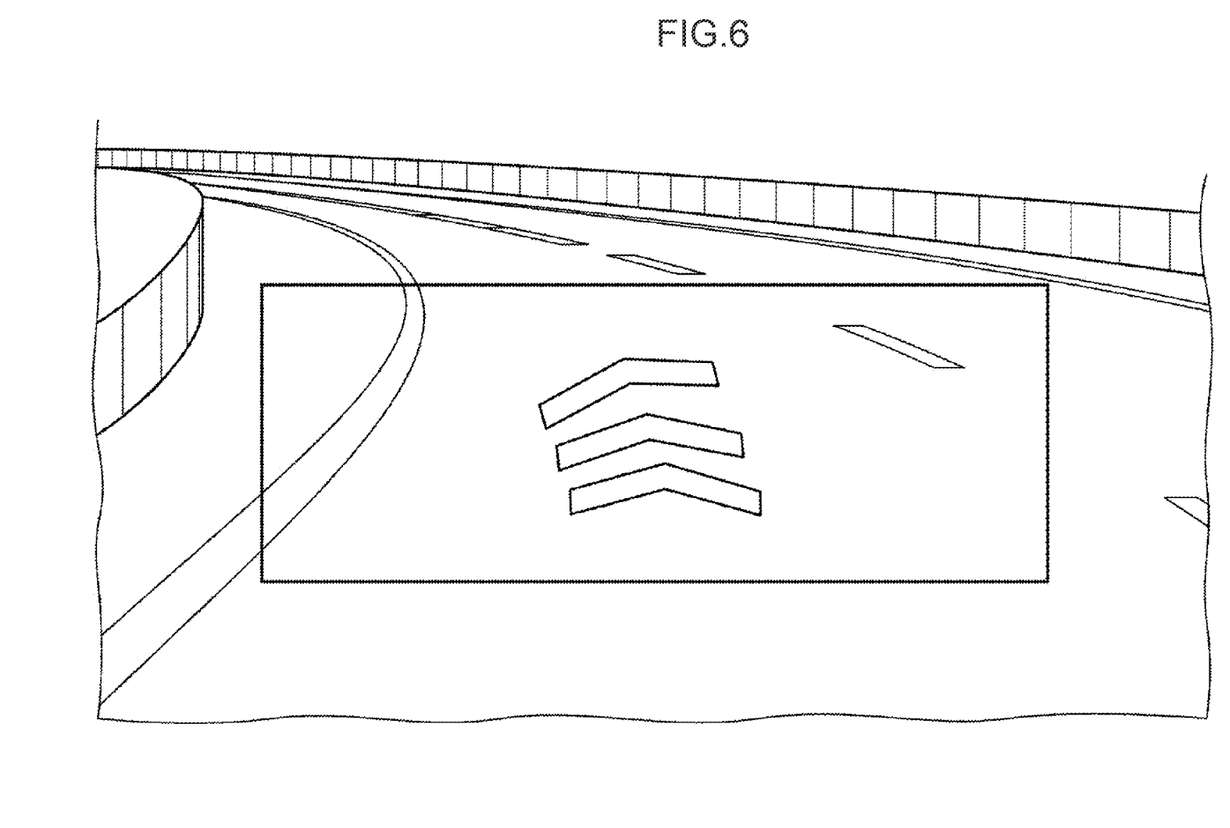
FIG. 6 is an image drawing illustrating a state in which, in the exemplary embodiment, content that guides the traveling path of a vehicle is displayed without the position thereof offset in the vehicle transverse direction with respect to the lane being traveled, as seen from the driver.

In step 116, the display control section 36 converts the coordinate values of the individual contents 62, which are disposed on the shifted path line 60, into coordinate values of the display coordinate system for displaying onto the HUD 12, and, on the basis of the coordinate values obtained by the conversion, causes the HUD 12 to display the individual contents 62. Due thereto, as shown in FIG. 6, the contents 62 that are projected onto the windshield 18 are, as seen from the vehicle occupant, displayed without being offset from the lane in which the host vehicle is traveling.

When the processing of step 116 ends, the routine returns to step 100, and, while the judgment of step 100 is affirmative, step 104 through step 116 are repeated. Due thereto, even if the distance AD changes, the contents 62 can be displayed without being offset, and so as to follow the changes in the distance AD.

As described above, in the present exemplary embodiment, the display control ECU 22 functions as the display control section 36 that, when a path line, which is expressed by path line information included in map information for navigation, is to be shifted in the vehicle transverse direction in accordance with the distance along the vehicle transverse direction between the vehicle position and the path line, causes the contents 62 to be displayed on the HUD 12 at corresponding positions on the shifted path line. Due thereto, the contents 62 being displayed such that their positions are offset in the vehicle transverse direction from the lane in which the vehicle is traveling, is suppressed, and the appearance of the contents 62 that guide the traveling path of the vehicle can be improved.

Further, in the present exemplary embodiment, the display control section 36 specifies the vehicle transverse direction on the basis of the azimuth of the vehicle that is detected by the azimuth sensor 56. Due thereto, the vehicle transverse direction can be specified accurately.

Further, in the present exemplary embodiment, the display control section 36 uses the position of the eyepoint of a vehicle occupant within the vehicle as the position of the vehicle. Due thereto, the contents 62 being displayed such that their positions are offset in the vehicle transverse direction from the lane being travelled, as seen from the vehicle occupant, is suppressed, and the appearance of the contents 62 as viewed from the vehicle occupant can be improved more.

Moreover, in the present exemplary embodiment, the HUD 12 is used as the display device. In accordance with the present disclosure, the HUD 12 can be made to function as an AR-HUD because the displaying of contents, which is such that their positions are offset in the vehicle transverse direction from the lane being travelled, is suppressed.

Note that the above exemplary embodiment describes a form in which graphics, which are shapes formed by bending rectangular graphics at length direction intermediate portions thereof in the direction of guiding the traveling path of the vehicle, are used as the contents 62 that guide the traveling path of the vehicle. However, the contents 62 are not limited to the above-described shape, and may be triangular or the like for example.

Further, although the above describes a form in which the HUD 12 is used as the display device in the present disclosure, the display device is not limited to the HUD 12, and may be, for example, the meter display of a vehicle or the like.

A form is described above in which the display control program 34 relating to the present disclosure is stored in advance (is installed) in the storage 28. However, the display control program relating to the present disclosure can also be provided in a form of being recorded on a non-transitory recording medium such as an HDD, an SSD, a DVD or the like.

What is claimed is:

1. A vehicle display control device comprising a processor that is configured to execute program instructions stored in a non-transitory computer readable storage medium to:
    acquire a current position of a vehicle;
    acquire a current position of an eyepoint of a vehicle occupant who is within the vehicle;
    based on map information that includes path line information that expresses path lines that are set along respective roads expressed by the map information, acquire a path line corresponding to the current position of the vehicle;
    calculate a distance along a vehicle transverse direction between the current position of the eyepoint of the vehicle occupant and the acquired path line corresponding to the current position of the vehicle;
    shift the acquired path line corresponding to the current position of the vehicle in a vehicle transverse direction in accordance with the calculated distance along the vehicle transverse direction between the current position of the eyepoint of the vehicle occupant and the acquired path line corresponding to the current position of the vehicle; and
    display content that guides a traveling path of the vehicle on a heads-up display device (HUD) at a corresponding shifted position on the shifted path line, wherein the content comprises multiple shapes placed along the shifted path line;
    wherein the processor executes instructions to determine the vehicle transverse direction on the basis of an azimuth of the vehicle that is detected by an azimuth sensor.

2. A vehicle display control device according to claim 1, wherein the processor converts coordinate values of content to be displayed, which is disposed on the shifted path line, into coordinate values of a display coordinate system for displaying on to the display device, and based on the converted coordinate values, causes the display device to display the content.

3. A vehicle display control device according to claim 1, wherein the processor acquires coordinates of the current position of the vehicle from a Global Navigation Satellite System device, acquires a relative position of the eyepoint of the vehicle occupant within the vehicle, and based on the coordinates of the current position of the vehicle, and the relative position of the eyepoint of the vehicle occupant, calculates coordinates of the eyepoint of the vehicle occupant.

4. The vehicle display control device of claim 1, wherein the heads-up display comprises a concave mirror that reflects content onto the windshield, and a mirror angle changing actuator, and wherein the processor executes program instructions to move the mirror by the mirror angle changing actuator to display the content at the corresponding shifted position on the shifted path line.

5. The vehicle display control device of claim 1, wherein the processor executes program instructions to determine if the vehicle is in adaptive cruise control (ACC) mode, and only shifts the acquired path line if the vehicle is not in ACC mode.

6. The vehicle display control device of claim 1, wherein the current position of the eyepoint of the vehicle occupant is determined relative to the vehicle position, and the shift is based on the vehicle transverse position within the lane, and the eyepoint relative to the vehicle.

7. The vehicle display control device of claim 1, wherein the processor converts coordinate values of individual contents to be displayed on the shifted path line into coordinate values of the display coordinate system for displaying the HUD.

8. A vehicle display control method that causes a computer to execute processings including,
    acquiring a current position of a vehicle;
    acquiring a current position of an eyepoint of a vehicle occupant who is within the vehicle;
    based on map information that includes path line information that expresses path lines that are set along respective roads expressed by the map information, acquiring a path line corresponding to the current position of the vehicle;
    calculating a distance along a vehicle transverse direction between the current position of the eyepoint of the vehicle occupant and the acquired path line corresponding to the current position of the vehicle;
    shifting the acquired path line corresponding to the current position of the vehicle in a vehicle transverse direction in accordance with the calculated distance along the vehicle transverse direction between the current position of the eyepoint of the vehicle occupant and the acquired path line corresponding to the current position of the vehicle;
    displaying content that guides a traveling path of the vehicle on a heads-up display device (HUD) reflected onto a windshield of the vehicle at a corresponding position on the shifted path line, wherein the content comprises multiple shapes placed along the shifted path line; and
    determining the vehicle transverse direction on the basis of an azimuth of the vehicle that is detected by an azimuth sensor.

9. A non-transitory computer-readable storage medium storing a vehicle display control program for causing a computer to execute processings including,
    acquiring a current position of a vehicle;
    acquiring a current position of an eyepoint of a vehicle occupant who is within the vehicle;
    based on map information that includes path line information that expresses path lines that are set along respective roads expressed by the map information, acquiring a path line corresponding to the current position of the vehicle;
    calculating a distance along a vehicle transverse direction between the current position of the eyepoint of the vehicle occupant and the acquired path line corresponding to the current position of the vehicle;
    shifting the acquired path line corresponding to the current position of the vehicle in a vehicle transverse direction in accordance with the calculated distance along the vehicle transverse direction between the current position of the eyepoint of the vehicle occupant and the acquired path line corresponding to the current position of the vehicle;
    displaying content that guides a traveling path of the vehicle on a heads-up display device (HUD) reflected onto a windshield of the vehicle at a corresponding position on the shifted path line, wherein the content comprises multiple shapes placed along the shifted path line; and determining the vehicle transverse direction on the basis of an azimuth of the vehicle that is detected by an azimuth sensor.

* * * * *